United States Patent [19]
Williams

[11] Patent Number: 4,965,822
[45] Date of Patent: Oct. 23, 1990

[54] FULL DUPLEX SPEAKERPHONE

[75] Inventor: Errol R. Williams, Austin, Tex.

[73] Assignee: VideoTelecom Corp., Austin, Tex.

[21] Appl. No.: 335,239

[22] Filed: Apr. 10, 1989

[51] Int. Cl.$^5$ .................. H04M 1/60; H04M 9/08
[52] U.S. Cl. ................................ 379/390; 379/411
[58] Field of Search ............. 379/388, 389, 390, 406, 379/411, 58; 370/32, 32.1

[56] References Cited

U.S. PATENT DOCUMENTS

4,629,829  12/1986  Puhl et al. ........................ 379/411
4,670,903   6/1987  Araseki et al. ................... 379/410

Primary Examiner—James L. Dwyer
Assistant Examiner—M. W. Shehata
Attorney, Agent, or Firm—Rockey and Rifkin

[57] ABSTRACT

Disclosed is an adaptive Finite Impulse Response ("FIR") filter speakerphone that provides improved echo cancelation by the inclusion of a tracking comb filter having nulls which change to track the voice portion of communications. The speakerphone also includes a pair of ambient noise recorders for recording both ambient background noise received from the telephone line and ambient background noise in the signal to be transmitted to the telephone line. During intervals of low signal level, pre-recorded ambient noise is substituted for the communication signals. The speakerphone also controls the respective strengths of the received and transmitted signals during intervals when voice signals are present. A delay buffer adapts the speakerphone for use in videoconferencing.

23 Claims, 4 Drawing Sheets

FULL DUPLEX SPEAKERPHONE

BACKGROUND OF THE INVENTION

The present invention relates generally to telecommunications and, more particularly, to methods and apparatus for echo and feedback suppression in full duplex speakerphone type voice communication.

A speakerphone substitutes a microphone and an audio speaker, located either in a separate enclosure or included in the telephone itself, for the customary telephone handset. Some of the advantages provided by speakerphones are hands free operation, group conference calls, and being able to do other things while waiting "on hold." Speakerphones are essential for practical videoconferencing. Similar voice communication systems are also used independently of the telephone system. For example, such voice communication systems are used in intercoms of the type used for taking drive-up orders at fast food restaurants.

Since the microphone and speaker in a speakerphone are at greater distances from the user than in an customary telephone handset, amplification, in addition to that provided for the customary telephone handset, must be applied to both the signals received by and transmitted from a speakerphone. Acoustic coupling between the speaker and the microphone in a speakerphone, i.e. room echo, and electrical coupling between the signals receive by and transmitted from a speakerphone, unless properly controlled cause echoes and "feedback" or "singing."

There are two generally recognized techniques for suppressing echoes and singing in speakerphones. One technique, is known as "voice-switching" or "simplex switching." A voice-switching speakerphone includes two separate variable gain amplifiers, one amplifier being used to amplify or attenuate the signal received by the speakerphone, and the other one amplifying or attenuating the signal transmitted from the speakerphone.

In voice-switching speakerphones, a control circuit monitors the respective strength of the received and transmitted signals. If the transmit signal is stronger, then the control circuit causes the transmitted signal to receive maximum amplification while the received signal receives maximum attenuation, and conversely. To prevent singing under all circumstances, the received signal and transmitted signal amplifiers must provide a total gain between the speakerphone's microphone and its speaker that is less than one (1.0).

A significant difficulty with voice-switching speakerphones arises from their simplex operation. Simplex operation allows only one party to the telephone call to speak at a time. If both parties attempt to speak simultaneously, only one party's voice will be successfully transmitted to the other party, and perhaps neither party will hear the other. Furthermore, the time required to adjust the respective amplification and attenuation of the transmitting and receiving amplifiers in a voice-switching speakerphone momentarily clips the beginning of each message as the two parties converse back and forth.

A second generally recognized technique for suppressing echoes and singing in speakerphones is the use of adaptive Finite Impulse Response ("FIR") filters. By using a pair of adaptive FIR filters in a speakerphone, the voice of one party may be transmitted while the other party's voice is being received. Consequently, a speakerphone employing a pair of adaptive FIR filters does not clip the beginning of each message as the two parties converse back and forth, thereby allowing both parties to speak simultaneously.

In an adaptive FIR filter speakerphone, one of the adaptive FIR filters transmits an echo canceling signal from the output of a received signal summing junction to a transmitted signal summing junction in which it is combined with the speakerphone's microphone output signal. The output signal from the transmitted signal summing junction is the signal transmitted to the telephone line from the speakerphone. Simultaneously with combining an echo canceling signal with the microphone output signal in the transmitted signal summing junction, the other adaptive FIR filter transmits an echo canceling signal from the output of the transmitted signal summing junction to the received signal summing junction in which it is combined with the received signal. The output signal from the received signal summing junction is supplied to the speaker of the speakerphone.

To permit a digital signal processing implementation of adaptive FIR digital filters, both the signal received by the speakerphone and the signal produced by its microphone are first digitized. These digital signals are then processed by digital circuits which provide the adaptive FIR filters and the summing junctions. The digital signals resulting from this digital signal processing are then converted back to analogue signals for application to the speakerphone's speaker and for transmission to the telephone line.

To convert between analogue and digital signals, an adaptive FIR digital filter speakerphone includes both a pair of Analogue to Digital Converters (ADCs"), and a pair of Digital to Analogue Converters ("DACs"). One of the ADCs converts the received analogue signal into a digital signal for processing by the adaptive FIR digital filter while one of the DACs converts the processed digital received signal back to an analogue signal. Similarly, the second ADC converts the analogue signal from the microphone into a digital signal for processing while the second DAC converts the digital transmitted signal back to an analogue signal. In addition to the pair of adaptive FIR digital filters, ADCs, and DAC's, an adaptive FIR digital filter speakerphone also includes a pair of variable gain amplifiers for respectively increasing the strength of the received and transmitted signals.

The use of digital signal processing techniques, including adaptive FIR digital filters, for echo canceling in the simultaneous reception and transmission of telephone signals is described in chapter 15 of a book entitled "Digital Signal Processing Applications with the TMS320 Family—Theory, Algorithms, and Implementation," copyright 1986, Texas Instruments Incorporated. Chapter 15, entitled "Digital Voice Echo Canceller with a TMS32020," specifically describes using a Texas Instruments TMS32020 digital signal processor integrated circuit to construct a digital echo canceler which meets or exceeds the performance required under CCITT G.165 recommendations.

While adaptive FIR digital speakerphones suppress echoes and feedback to the extent required for successful operation, there still remains some residual echo due to feedback from the speaker to the microphone that is not canceled by the adaptive FIR filter.

Another problem with the adaptive FIR digital filter speakerphone arises from the wide dynamic range of the received and transmitted signals. To compensate for this wide dynamic range, adaptive FIR digital filter speakerphones generally apply Automatic Gain Control ("AGC") to both the transmitted and received signals. However, during periods of silence, when neither party, is speaking, the low signal level causes the AGC circuit to increase the amplifiers' gain to such an extent that background room noise dominates.

To remove the residual portion of echoes during intervals of low signal level, prior speakerphones may perform what is known as "echo suppression" by either disabling the corresponding output signal or by substituting white noise for the corresponding output signal. However, in typical conference rooms or offices, this switching is apparent and it is obvious that the incoming signal is being switched off in response to signal level changes.

SUMMARY OF THE INVENTION

The present invention provides an improved full duplex speakerphone having significantly improved characteristics for voice communications.

An object of the present invention is to provide a speakerphone having improved echo suppression during intervals of voice communication.

Another object of the present invention is to provide a speakerphone that does not excessively increase signal levels during periods of silence when neither party is speaking.

Another object of the present invention is to provide a speakerphone having echo suppression during intervals of low signal level that is not apparent to those communicating over the speakerphone.

Briefly, the present invention is an adaptive FIR filter speakerphone which further includes a tracking comb filter interposed between the output of the transmitted signal summing junction and the telephone line through which the output signal from the transmitted signal summing junction passes before being transmitted to the telephone line. In the preferred embodiment, the signal from the transmitted signal summing junction passes through the tracking comb filter prior to being transmitted to the telephone line only when the characteristics of the received signal indicates that the speakerphone is receiving a voice signal from the telephone line. Further, in the preferred embodiment the characteristics of the tracking comb filter are continuously adjusted so that nulls in its transfer function match the frequency of the voice signals which the speakerphone receives from the telephone line.

An adaptive FIR filter speakerphone in accordance with the preferred embodiment of the present invention also includes a pair of ambient noise recorders respectively for recording both ambient background noise received from the telephone line and ambient background noise in the signal to be transmitted to the telephone line. During intervals in which the level of the signal received from the telephone line is below a threshold, pre-recorded ambient noise from the received signal ambient noise recorder is substituted for the signal received from the telephone line. Similarly, during intervals in which the level of the transmitted signal is below a threshold, pre-recorded ambient noise from the transmitted signal ambient noise recorder is substituted for the signal received from the speakerphone's microphone.

An adaptive FIR filter speakerphone in accordance with the preferred embodiment of the present invention also alters the respective strengths of the received and transmitted signals only during intervals when the respective characteristics of those signals indicate that voice signals are present.

The preferred embodiment of the speakerphone of the present invention, especially adapted for use in video teleconferencing, further includes a delay buffer for delaying the transmission of the received signal to the speaker. The delay imposed by the delay buffer is selected to match the delay in the transmission of video images. Thus, the delay imposed by the delay buffer causes the audible communication heard by the speakerphone's user to be in sync with the video image that the user sees.

An advantage of the present invention is that it provides significantly improved echo suppression during full duplex voice communication.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENT

Figure 1:
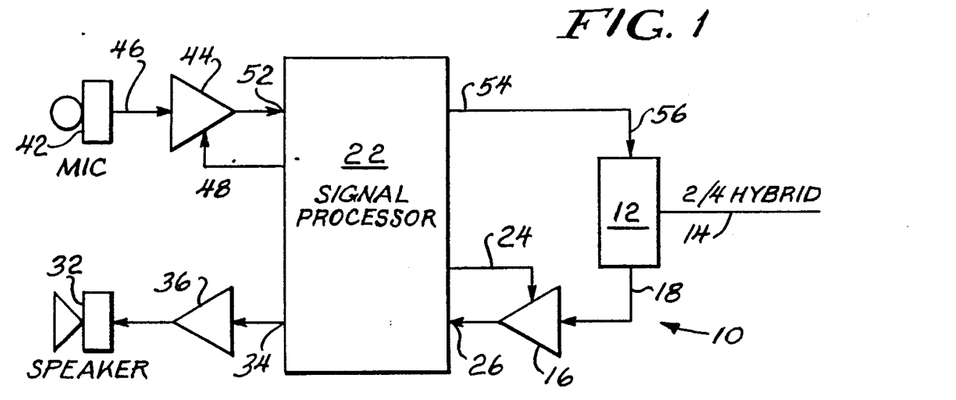
FIG. 1 is a functional block diagram depicting a speakerphone in accordance with the present invention including variable gain amplifiers and a signal processor.

FIG. 1 depicts a speakerphone in accordance with the present invention identified by the general reference character 10. The speakerphone 10 includes a two-wire to four-wire hybrid 12 for receiving an analogue signal from and transmitting an analogue signal to a telephone line 14. The hybrid 12 applies the received signal as an input to a variable gain amplifier 16 over line 18. A gain control signal is applied to the amplifier 16 from a signal processor 22 via line 24 to control the signal level of the analogue received signal. After amplification, the analogue received signal is transmitted to an input 26 of the signal processor 22. After the received signal has been processed within the signal processor 22, it is transmitted as an analogue signal to a speaker 32 from output 34 of the signal processor 22 via a power amplifier 36. The speaker 32 presents the analogue received signal to a user of the speakerphone 10 as an audible communication.

The speakerphone 10 also includes a microphone 42 for converting an audible communication into an analogue microphone output signal. This signal is applied as an input signal to a variable gain amplifier 44 via line 46. A gain control signal is applied to amplifier 44 from the signal processor 22 via line 48 to control the signal level of the analogue microphone output signal. After amplification, the analogue microphone output signal is transmitted to a microphone signal input 52 of the signal processor 22. After the signal has been processed within the signal processor 22, it is transmitted as an analogue transmitted signal to the telephone line 14 via output 54, line 56 and the hybrid 12.

Figure 2:
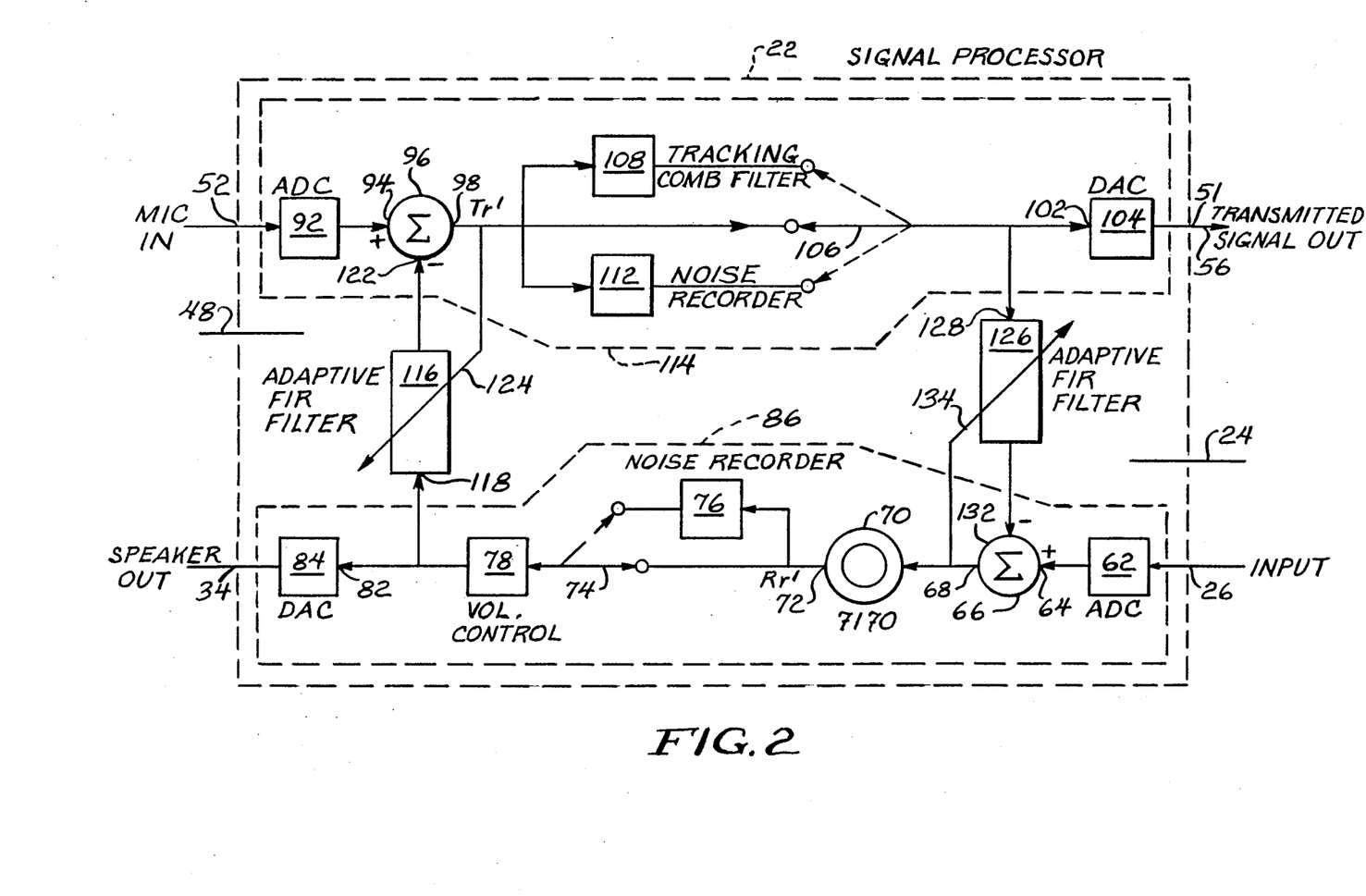
FIG. 2 is a functional block diagram depicting the signal processor shown in FIG. 1 including ADCs, DACs, adaptive FIR filters, a comb filter and ambient noise recorders.

The signal processor 22, depicted in FIG. 2, includes a received signal Analog-to-Digital Converter ("ADC") 62. The received signal ADC 62 digitizes the analogue signal into a digital received signal, and applies it to a first input 64 of summing junction 66.

The received signal summing junction 66 has an output 68 from which it transmits a digital signal to a First-In First-Out ("FIFO") delay buffer 70. The delay buffer 70 has an output 72 from which it transmits a digital received signal $Rx'$. The FIFO delay buffer 70 is included in the speakerphone 10 to adapt the signal processor 22 for use in a video teleconferencing system such as that described in copending patent application no. 07/046,248 filed May 4, 1987 and assigned to the present assignee. The FIFO delay buffer 70 delays the sound of a speaker's voice by substantially the same interval of time as the speaker's picture is delayed by the signal processing required for its transmission over telephone circuits. This delay is generally in the range of 150 milliseconds to 1 second. If a speakerphone 10 in accordance with the present invention is used by itself or is not used in parallel with another transmission which is delayed, FIFO delay buffer 70 may be omitted.

The signal $Rx'$ from the output 72 of the delay buffer 70 is supplied, either directly via a selector switch 74 or indirectly via a received ambient noise recorder 76, to a volume control 78. The volume control 78 allows a user of the speakerphone 10 to control the volume of the audible communication presented by the speaker 32. Since a digital signal is applied to the volume control 78, its output signal is obtained from its input signal by multiplication. The output from the volume control 78 is applied to an input 82 to a Digital-to-Analog Converter ("DAC") 84. The DAC 84 converts the digital signal $Rx'$ into an analogue signal and applies that analogue signal to the speaker signal output 34 of the signal processor 22.

Thus, the signal processor 22 includes a received signal processing path 86 which is enclosed within dashed lines in FIG. 2.

The signal processor 22 also includes a transmit ADC 92 that receives the analogue microphone output signal input 52. The transmit ADC 92 digitizes that analogue signal into a digital microphone output signal, and applies it to a first input 94 of a transmitted signal summing junction 96.

The summing junction 96 has a processed transmitted signal output 98 from which it transmits a digital processed transmitted signal $Tx'$. The signal $Tx'$ is transmitted to an input 102 of a transmitted signal DAC 104 either directly through a switch 106, or indirectly via either a tracking comb filter 108 or a transmit ambient noise recorder 112. The DAC 104 converts the $Tx'$ signal into an analogue signal and provides it to output 54.

As described above, the signal processor 22 includes a transmitted signal processing path 114 which is enclosed within dashed lines in FIG. 2.

In the preferred embodiment, the signal processor 22, except for the ADCs 62 and 92 and the DACs 84 and 104, may be implemented using a Texas Instruments TMS320C25 Digital Signal Processor integrated circuit ("TMS320") and a digital computer program that is executed by the TMS320. The combination of the TMS320 with the digital computer program performs all of the signal processing operations other than the analog-to-digital and digital-to-analog conversions.

In the preferred embodiment the ADCs 62 and 92 digitize their respective input analogue signals in response to an 8 KHz control signal. Accordingly, every 125 microseconds the received signal ADC 62 converts a sample of the analogue received signal into the digital received signal. Simultaneously, the transmit ADC 92 converts a sample of the analogue microphone output signal into the digital microphone output signal. Further, the execution of the digital computer program by the TMS320 is synchronized to the digitization of analogue signals by the ADCs 62 and 92.

The signal processor 22 includes a near side echo canceling adaptive Finite Impulse Response ("FIR") digital filter 116 having a signal input 118 that receives the same signal as applied to the input 82 of the receive DAC 84. The near side echo canceling filter 116 applies a selected portion of the signal at its input 118 to a second input 122 of the transmitted summing junction 96. In the summing junction 96, the output from the echo canceling filter 116 is subtracted from the digital microphone output signal. As is known in the art, the coefficients of the adaptive FIR filter 116 are obtained from the $Tx'$ signal as indicated by filter control signal line 124.

The signal processor 22 also includes a far side echo canceling adaptive FIR digital filter 126 having a signal input 128 that receives the same signal as applied to the input 102 of the DAC 104. The far side echo canceling filter 126 applies a selected portion of the signal at its signal input 128 to a second input 132 of the received signal summing junction 66. In the summing junction 66, the output from the echo canceling filter 126 is subtracted from the received digital signal. Analogous to the near side echo canceling filter 116, the coefficients of the adaptive FIR digital filter 126 are obtained from the processed received signal $Rx'$ as indicated by a control signal line 134.

Tracking Comb Filter Processing

The signal processor 22 uses the transmitted signal selector switch 106 to permit the signal $Tx'$ to pass through the tracking comb filter 108 only when the characteristics of the processed received signal $Rx'$ indicates that voice is present in the received signal.

Figure 3:
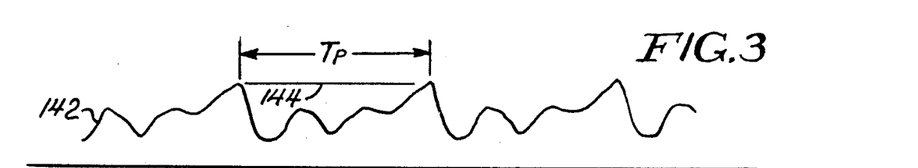
FIG. 3 depicts several periods of a typical voice waveform.

Referring to FIG. 3, there is depicted several periods of a typical voice waveform 142. The waveform is generally characterized by an almost periodic signal whose waveform varies relatively slowly between immediately successive periods. Accordingly, a period, $Tp$, between peak amplitudes of voice signal in the processed received signal $Rx'$ varies relatively slowly and can be easily determined.

To determine the period $Tp$ between successive peaks in the amplitude of the processed received signal $Rx'$, the signal processor 22 repetitively tests the amplitude of that signal at intervals of 125 microseconds, i.e. the sampling rate at which the ADCs 62 and 92 respectively convert the analogue received signal and microphone output signal into digital signals. The signal processor 22 determines that a peak has occurred when the amplitude of the processed received signal Rx' begins decreasing. Once the signal processor 22 identifies a peak in the amplitude of the processed received signal Rx', it measures the time interval Tp to the next peak in the amplitude of the processed received signal Rx' by continuing its repetitive testing of that signal at 125 microsecond intervals while simultaneously maintaining a running count, Nc, of the number of times the signal is tested without finding a peak. To allow for the possibility that the level of the processed received signal Rx' may be decreasing, a threshold amplitude 144 that the signal processor 22 will accept as the next peak decreases 5% every 10 milliseconds from the amplitude of the immediately preceding peak. After the level of the processed received signal Rx' reaches or exceeds this decreasing threshold amplitude, the signal processor 22 then determines that a subsequent peak has occurred when that amplitude again begins decreasing. The signal processor 22 saves the count Nc of the number of tests between peaks as a measure of the time interval Tp between the two immediately successive peaks in the amplitude of the signal Rx'.

To determine whether voice is present in the processed received signal Rx', the signal processor 22 compares the counts $Nc_{i-1}$ and $Nc_i$ for two immediately successive periods of the processed received signal Rx'. If the two counts $Nc_{i-1}$ and $Nc_i$ are equal, then the signal processor 22 determines that the processed received signal Rx' is a whine or other very regular sounds and does not use the transmitted signal selector switch 106 to permit the transmitted signal Tx' to pass through the tracking comb filter 108.

Conversely, if the two counts $Nc_{i-1}$ and $Nc_i$ are unequal but do not differ by more than 2 counts, then the signal processor 22 determines that the signal Rx' contains a voice signal and uses switch 106 to permit the signal Tx' to pass through the tracking comb filter 108. In sum, if the difference between the two counts $Nc_{i-1}$ and $Nc_i$ for the processed received signal Rx' is other than 1 or 2, the signal processor 22 determines that the signal Rx' does not contain a voice signal.

Figure 4:
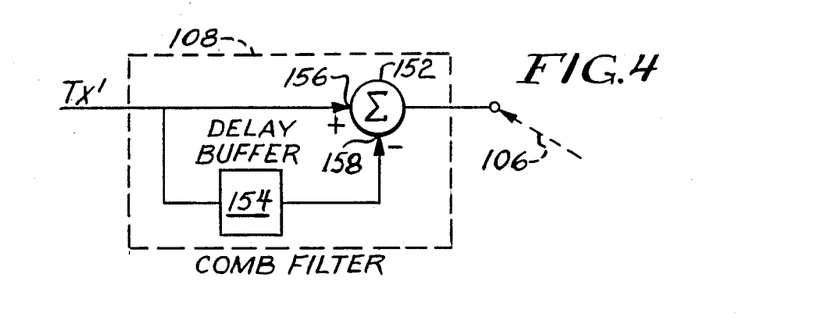
FIG. 4 is a functional block diagram depicting the comb filter included in FIG. 2.

FIG. 4 is a functional-type block diagram depicting the tracking comb filter 108 which includes a tracking filter summing junction 152 and a signal delay buffer 154. The processed transmitted signal Tx' is applied both to a first input 156 of the tracking filter summing junction 152 and to the signal delay buffer 154. The signal delay buffer 154 delays the signal Tx' by Nc samples, i.e. by the period Tp, before applying it to a second input 158 of the tracking filter summing junction 152. In the tracking filter summing junction 152, the delayed signal Tx' is subtracted from the signal Tx'.

Figure 5:
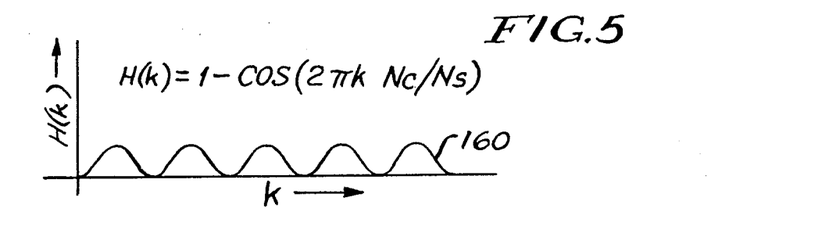
FIG. 5 is an amplitude versus frequency diagram depicting the transfer function of the comb filter included in FIG. 2.

FIG. 5 is an amplitude versus frequency diagram depicting a transfer function 160 for the tracking comb filter 108. The transfer function 160 results from subtracting a delayed sample of the signal Tx' taken from the signal delay buffer 154 from the present sample of the signal Tx' in the tracking filter summing junction 152. In the equation for the transfer function presented in FIG. 5:

k     is frequency;
Nc    is the count of the number of samples in one period of the processed transmitted signal Tx'; and
Ns    is the sampling rate, i.e., the number of samples per second, at which the transmit ADC 92 converts the processed transmitted signal Tx' from an -continued analogue to a digital signal.

As illustrated in FIG. 5, whenever the signal processor 22 determines that voice is present in the signal Rx', nulls in the transfer function of the tracking comb filter 108 block the transmission of those components in the transmitted signal Tx' that have a period Tp, or that have a period which is a higher harmonic of the period Tp. Consequently, during intervals in which the speakerphone 10 receives voice communications from the telephone line 14, such frequency components in the processed transmitted signal Tx' are not transmitted from the transmitted signal summing junction 96 to the DAC 104 and the far side echo canceling filter 126.

This operation causes frequency components in a voice signal received by the speakerphone 10 which are not eliminated from the transmitted signal Tx' by the near side echo canceling filter 116 to be blocked by the tracking comb filter 108. Since the nulls provided by the tracking comb filter 108 follow the period Tp in the processed received signal Rx', the signal processor 22 continuously places the nulls in the transfer function. Thus, the tracking comb filter 108 attenuates any voice signal in the microphone output signal resulting from feedback from the speaker 32 to the microphone 42, i.e. room echo, much more than it attenuates any audible communication sent by the user of the speakerphone 10. A typical improvement in echo suppression obtained by adding the tracking comb filter 108 to an adaptive FIR speakerphone is between 8 and 12 dB.

If both parties attempt to speak simultaneously while using a speakerphone 10 in accordance with the present invention, the perceived effect of the tracking comb filter 108 on the audible communications from the user of the speakerphone 10 is to make its user sound like he is speaking through a tube. However, since the processed transmitted signal Tx' passes through the tracking comb filter 108 only when the signal processor 22 determines that voice is present in the received signal Rx', this side effect of the tracking comb filter 108 is seldom noticed in practice.

Setting of Signal Gains

Satisfactory operation of the speakerphone 10 requires adjusting the respective signal levels of the received and the microphone output signals. However, as described above, merely applying Automatic Gain Control, AGC, to both the received and transmitted signals is undesirable.

To avoid the problems associated with conventional AGC, the speakerphone 10, in accordance with the present invention, changes the gain of the received signal variable gain amplifier 16 only if the signal processor 22 determines that voice is present in the received signal Rx'. Analogously, the signal processor 22 changes the gain of the microphone signal variable gain amplifier 44 only if the signal processor 22 determines that voice is present in the processed transmitted signal Tx'. By using the preceding technique, the received and transmitted signal levels are maintained within comfortable ranges for spoken communications while the respective gains of the amplifiers 16 and 44 are not increased to such an extent during periods of silence that background room noise becomes dominant.

The criteria used by the signal processor 22 to determine whether or not voice is present respectively in the signals Rx' and Tx' for purposes of controlling the respective gains of the variable gain amplifiers 16 and 44 are precisely the same as the criteria described above in connection with the tracking comb filter 108. As described in greater detail below, the speakerphone 10 avoids excessive compression of the dynamic range of analogue received signal and the microphone output signal by changing the respective levels of the analogue received signal and analogue microphone output signal only if the corresponding processed received signal Rx' or processed transmitted signal Tx' is not between a lower threshold and an upper threshold.

Ambient Noise Recording and Play Back

As mentioned previously, the signal processor 22 of the speakerphone 10 in accordance with the present invention includes the received ambient noise recorder 76 and the transmitted ambient noise recorder 112. Both ambient noise recorders 76 and 112 operate identically to provide a background noise signal respectively to the speaker 32 and to the telephone line 14 during low signal level intervals respectively for the processed received signal Rx' and the processed transmitted signal Tx'. However, rather than merely inserting white noise as performed by prior speakerphones which is apparent to their user, the speakerphone 10 inserts ambient noise recorded previously during a communication. Because the ambient noise was recorded during the communication, its insertion to replace residual echo during intervals of low signal levels is not readily apparent to either the user of the speakerphone 10 or to those with whom the speakerphone user is communicating.

Figure 6:
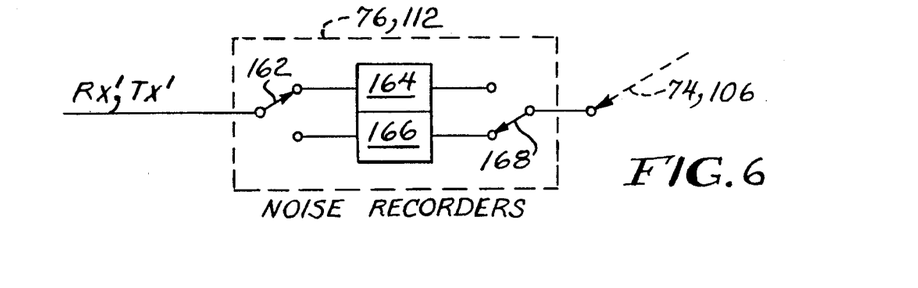
FIG. 6 is a block diagram depicting the ambient noise recorders included in FIG. 2.

Referring now to FIG. 2 and 6, each of the identical ambient noise recorders 76 and 112 includes an input buffer selector switch 162. Regardless of whether the ambient noise recorder is being used to record the processed received signal Rx' or the processed transmitted signal Tx', the signal applied to the buffer input selector switch 162 is stored either into buffer A 164 or into buffer B 166. Each of the buffers 164 and 166 preferably stores one-half second of ambient noise although they may store a little as 100 milliseconds or as much as 1 second of ambient noise. Depending upon whether the ambient noise recorder is either the received ambient noise recorder 76 or the transmitted ambient noise recorder 112, the output of one of the buffers 164 or 166 will be connected to either the received signal selector switch 74 or the transmitted signal selector switch 106 by an output buffer selector switch 168. The signal processor 22 uses the buffers 164 and 166 in each of the noise recorders 76 and 112 to record and play back background noise as follows.

In recording ambient noise, the signal processor 22 assigns an ambient background noise level respectively for the processed received signal Rx' and for the processed transmitted signal Tx' by determining the minimum average levels of these signals over some arbitrary time interval. Having determined the ambient background noise level, the signal processor 22 commences recording the processed signals Rx' or Tx' into one of the buffers 164 or 166 of the corresponding ambient noise recorder 76 or 112 if that signal's level drops below an arbitrary noise recording threshold greater than that signal's ambient background noise level. Recording of the processed signals Rx' or Tx' into one of the buffers 164 or 168 always commences at the beginning of the respective buffer 164 or 168. If at any time the level of the signal being recorded exceeds the noise recording threshold, then recording is terminated to be restarted again as described above when the signal level again drops below the arbitrary noise recording threshold. When background ambient noise fills the buffer 164 or 166, the signal processor 22 changes the input buffer selector switch 162 so that the processed signal Rx' or Tx' is then recorded into the other buffer 166 or 164.

If the signal level of the processed received signal Rx' falls below a play back received background noise threshold which is an arbitrary fraction of the signal level of the processed transmitted signal Tx', then signal processor 22 changes the received signal selector switch 74 to substitute ambient noise from the received ambient noise recorder 76 for the processed received signal Rx'. The signal processor 22 takes the ambient noise which it substitutes for the processed received signal Rx' from the buffer 164 or 166 in the received ambient noise recorder 76 opposite to that into which ambient noise may be recorded. If the signal level of processed received signal Rx' exceeds the play back received background noise threshold, then the signal processor 22 changes the received signal selector switch 74 back so background noise is no longer substituted for the processed received signal Rx'.

Analogously, if the signal level of the processed transmitted signal Tx' falls below a play back transmitted background noise threshold which is an arbitrary fraction of the signal level of the processed received signal Rx', then the signal processor 22 changes the transmitted signal selector switch 106 to substitute ambient noise from the transmitted ambient noise recorder 112 for the processed transmitted signal Tx'. Similarly, the signal processor 22 takes the ambient noise which it substitutes for the processed transmitted signal Tx' from the buffer 164 or 166 in the transmitted ambient noise recorder 112 opposite to that into which ambient noise may be recorded. If the signal level of processed transmitted signal Tx' exceeds the play back transmitted background noise threshold, then the signal processor 22 changes the transmitted signal selector switch 106 back so background noise is no longer substituted for the processed transmitted signal Tx'.

Overall Signal Processing

FIG. 7A through 7D depict the overall sequence of signal processing operations performed by the computer program that is executed by the TMS320 integrated circuit chip in the signal processor 22. Computer program execution commences with a processing step 202 in which the present sample of the digital microphone output signal is input to the TMS320 from the transmit ADC 92. Then, at processing step 204, the output signal from the near side echo canceling digital filter 116 is subtracted from the present sample of the digital microphone output signal in the transmitted signal summing junction 96 to obtain the processed transmitted signal Tx'. After obtaining the processed transmitted signal Tx', the coefficients of the near side echo canceling digital filter 116 are updated as indicated by the filter control signal line 124.

Figure 7A:
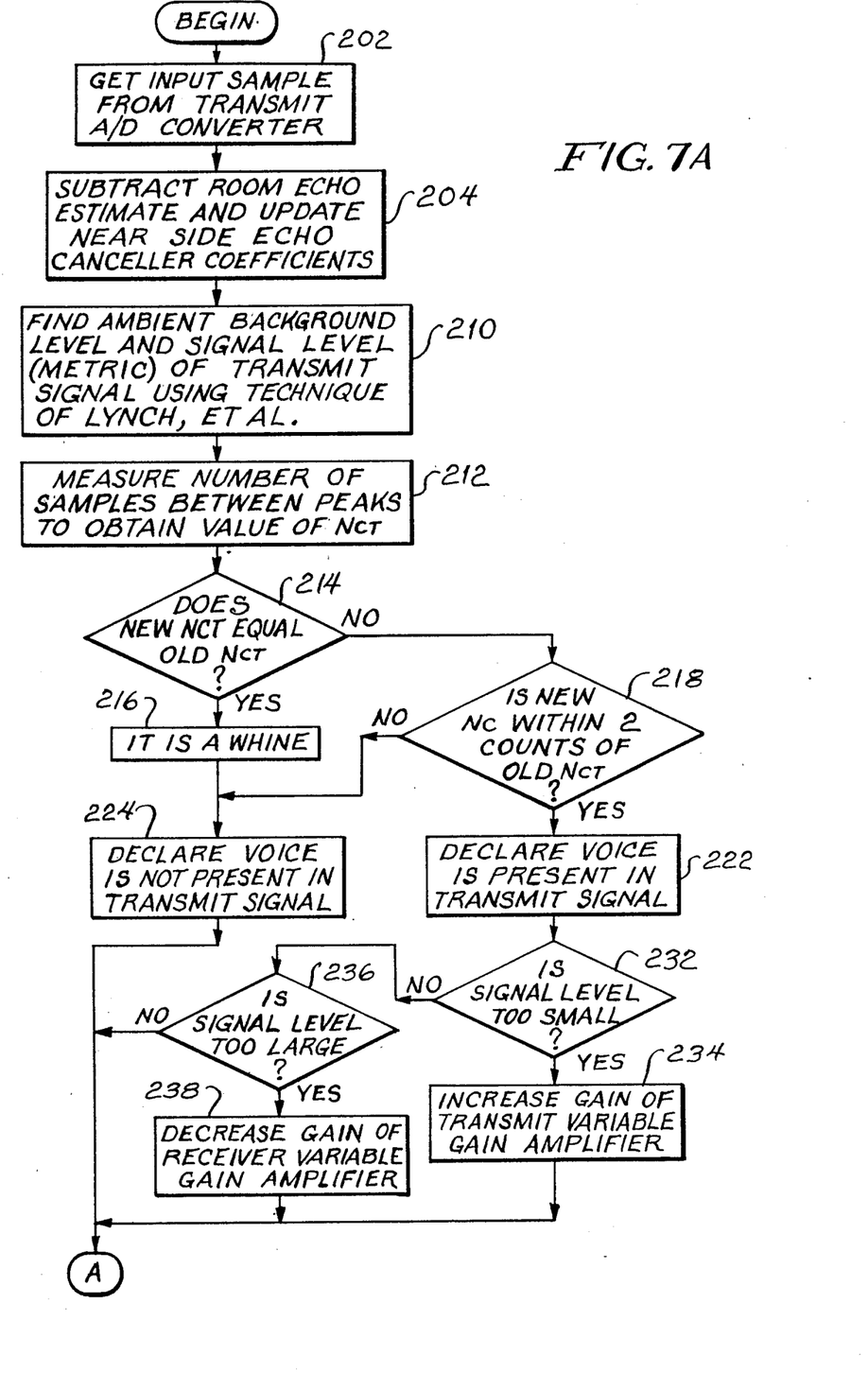
FIG. 7A through 7D make up a flow chart depicting the sequence of processing steps performed by the computer program that controls the operation of the signal processor.

After obtaining the present sample of the processed transmitted signal Tx', the computer program then determines, in processing step 210, the ambient background noise level and the signal level in the processed transmitted signal Tx'. In determining the ambient background noise level and the signal level, the computer program applies the criteria described by J. F. Lynch Jr. et al. in an article entitled "Speech/Silence Segmentation for Real-Time Coding Via Rule Based Adaptive Endpoint Detection" published at pages 1348 through 1351 of the *Proceedings of the 1987 International Conference on Acoustics, Speech, and Signal Processing.*

Having determined the ambient background noise level and the signal level in the processed transmitted signal Tx', the computer program, in processing step 212, next determines whether or not a peak has occurred in the amplitude of that signal. If a peak has occurred in the amplitude of the processed transmitted signal Tx', the computer program also determines the value of Nc for the processed transmitted signal Tx', i.e. Nct, between the current peak and the immediately preceding one.

The computer program then determines whether or not a voice signal is present in the processed transmitted signal Tx' by comparing the new value of Nct, i.e. $Nct_i$, for the processed transmitted signal Tx' with the immediately preceding value of Nct, i.e. $Nct_{i-1}$, for that same signal. The determination of whether or not voice is present in the processed transmitted signal Tx', which is performed in the manner described above for the processed received signal Rx' in connection with the operation of the tracking comb filter 108, is performed in program steps 214 through 224 of FIG. 7A. As shown in processing steps 222 and 224, the computer program always expressly decides whether or not voice is present in the processed transmitted signal Tx'.

If voice is present in the processed transmitted signal Tx', in program steps 232 through 238 the computer program next determines whether or not the gain of the microphone signal variable gain amplifier 44 is to be increased or decreased. In determining whether or not to increase or decrease the signal level of the analogue microphone output signal as described above in connection with setting the signal gains, the computer program tests the signal level for the processed transmitted signal Tx' that was determined previously in processing step 210.

Figure 7B:
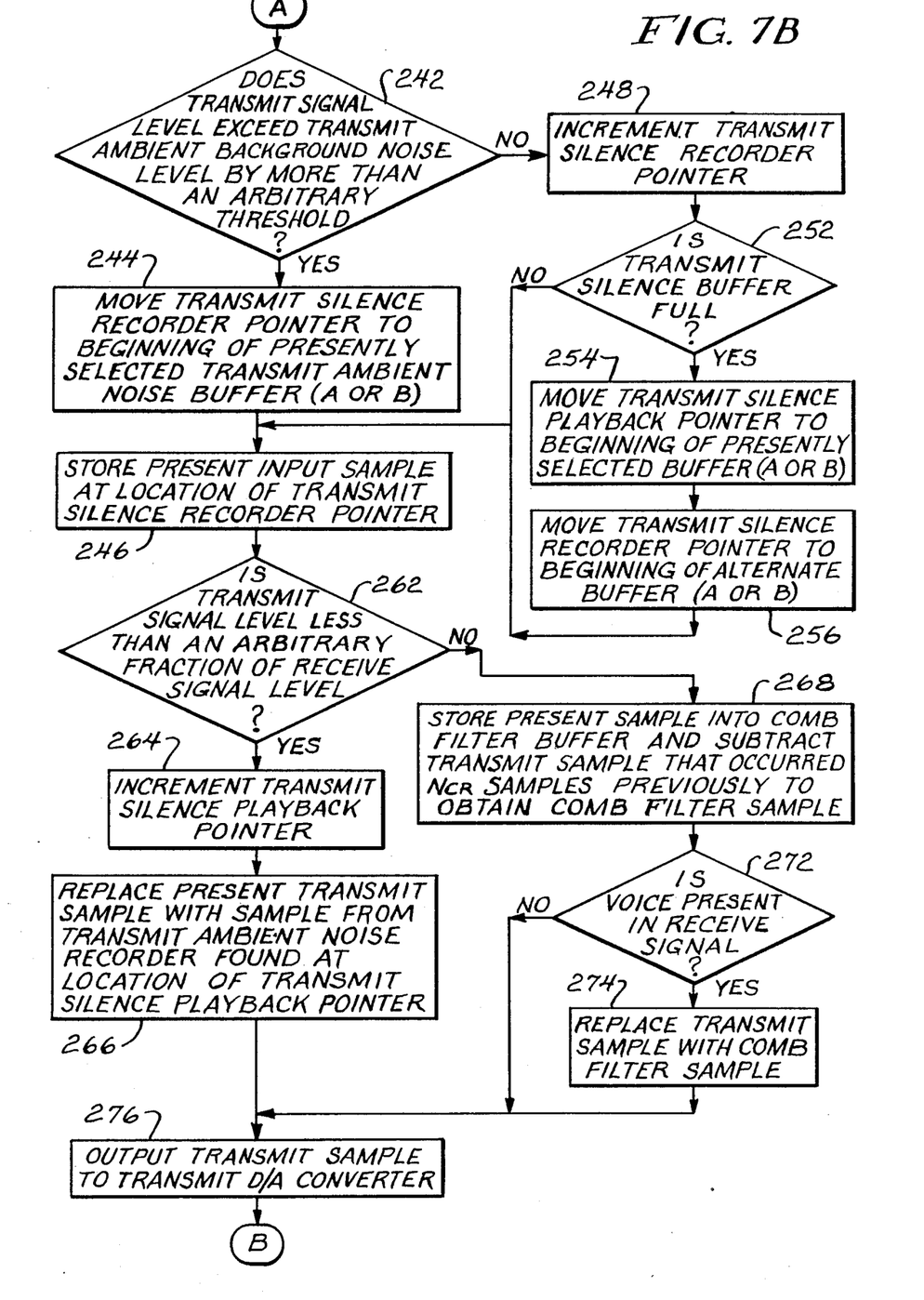

Having decided whether or not to increase or decrease the signal level of the analogue microphone output signal, the computer program, in steps 242 through 256, next stores ambient noise in the transmitted ambient noise recorder 112. Storing ambient noise in the transmitted ambient noise recorder 112 commences with decision step 242 in which the computer program determines whether the signal level of the processed transmitted signal Tx', determined above in processing step 210, exceeds the ambient background noise level, also determined in that same step, by more than some arbitrary threshold, i.e. determines whether the signal level of the processed transmitted signal Tx' exceeds the noise recording threshold. If the signal level of the processed transmitted signal Tx' exceeds the noise recording threshold, then, in processing step 244, the computer program changes a record buffer pointer to the beginning of the buffer 164 or 166 which the computer program has assigned as the present recording buffer in the transmitted ambient noise recorder 112. And then the computer program, in processing step 246, stores the present sample of the processed transmitted signal Tx' at the location indicated by the record buffer pointer. By resetting the record buffer pointer every time the signal level of the processed transmitted signal Tx' exceeds the noise recording threshold, all prior recording in the recording buffer 164 or 166 is erased.

Alternatively, if the signal level of the processed transmitted signal Tx' does not exceed the noise recording threshold, then recording is to continue. Thus, in processing step 248, the computer program increments the record buffer pointer to the next recording location in the recording buffer 164 or 166 in the transmitted ambient noise recorder 112. Having incremented the pointer to the next recording location in the presently selected buffer 164 or 166, the computer program then determines whether or not the recording buffer 164 or 166 is full in decision step 252. If the buffer 164 or 166 is not full, then, in processing step 246, the present sample of the processed transmitted signal Tx' is stored at the location in the recording buffer 164 or 166 indicated by the record pointer. If the buffer 164 or 166 is full, then, in processing step 254, the computer program changes a silence play back pointer to point to the beginning of the current recording buffer 164 or 166 in the transmitted ambient noise recorder 112 thereby making that buffer the current play back buffer. And then in processing step 256, the computer program changes the recording pointer to point to the beginning of the opposite buffer 166 or 164 thereby making that buffer the current recording buffer. Having thus switched the play back and recording buffers because the recording buffer 166 or 164 was full, in processing step 246 the computer program then stores the present sample of the processed transmitted signal Tx' at the first location in the recording buffer 164 or 166.

With the present sample of the processed transmitted signal Tx' having now been stored into the recording buffer 164 or 166, the computer program next determines whether or not to substitute a previously recorded sample of ambient noise for the present sample of the processed transmitted signal Tx' thereby determining whether or not to select pre-recorded ambient transmitted noise with the transmitted signal selector switch 106. To determine whether or not to substitute a previously recorded sample of ambient noise for the present sample of the processed transmitted signal Tx', in decision step 262 the computer program determines whether the signal level of the processed transmitted signal Tx', determined above in processing step 210, is less than a reproduce transmitted background noise threshold which is an arbitrary fraction of the signal level of the processed received signal Rx'. If the signal level of the processed transmitted signal Tx' is less than the reproduce transmitted background noise threshold, then, in processing step 264, the computer program increments the silence play back pointer. And then in processing step 266, the computer program replaces the present sample of the processed transmitted signal Tx' with the sample of pre-recorded ambient noise from the location in the current play back buffer 164 or 166 indicated by the silence play back pointer thereby making a pre-recorded ambient noise sample the present processed transmitted signal Tx'.

If a sample of pre-recorded ambient noise is not to be substituted for the present sample of the processed transmitted signal Tx', the computer program first stores the present sample of the processed transmitted signal Tx' into the signal delay buffer 154 of the tracking comb filter 108. The computer program then applies the tracking comb filter 108 to the present sample of the processed transmitted signal Tx' by subtracting from that sample the sample of that signal previously saved in the signal delay buffer 154 which occurred Nc samples previously where Nc is that presently determined for the processed received signal Rx', i.e. Ncr. In decision step 272, the computer program then checks whether voice is present in the processed received signal Rx'. And if voice is present, in processing step 274 the computer program then replaces the present sample of the processed transmitted signal Tx' with the sample from the tracking comb filter 108. Processing of this sample of the processed transmitted signal Tx' then concludes in processing step 276 by transmitting the current sample of that signal to the transmitted signal DAC 104.

Having now completely processed the digital microphone output signal to produce the digital signal supplied to the transmitted signal DAC 104, the computer program then commences processing the digital received signal to produce the digital signal supplied to the receive DAC 84. As is evident from FIGS. 7A through 7D, computer program processing and decision steps 302, 304, and 310 through 366 applied to the digital received signal are precisely the same as the steps 202 through 266 applied to the digital microphone output signal with the exceptions that:

1. the digital received signal replaces the digital microphone output signal;
2. the far side echo canceling filter 126 with its filter control signal line 134 replaces the near side echo canceling filter 116 with its filter control signal line 124;
3. the processed received signal Rx' replaces the transmitted received signal Tx';
4. the received signal variable gain amplifier 16 together with its received signal gain control signal line 24 replaces the microphone signal variable gain amplifier 44 and its microphone signal gain control signal line 48; and
5. the received ambient noise recorder 76 replaces the transmitted ambient noise recorder 112.

Figure 7C:
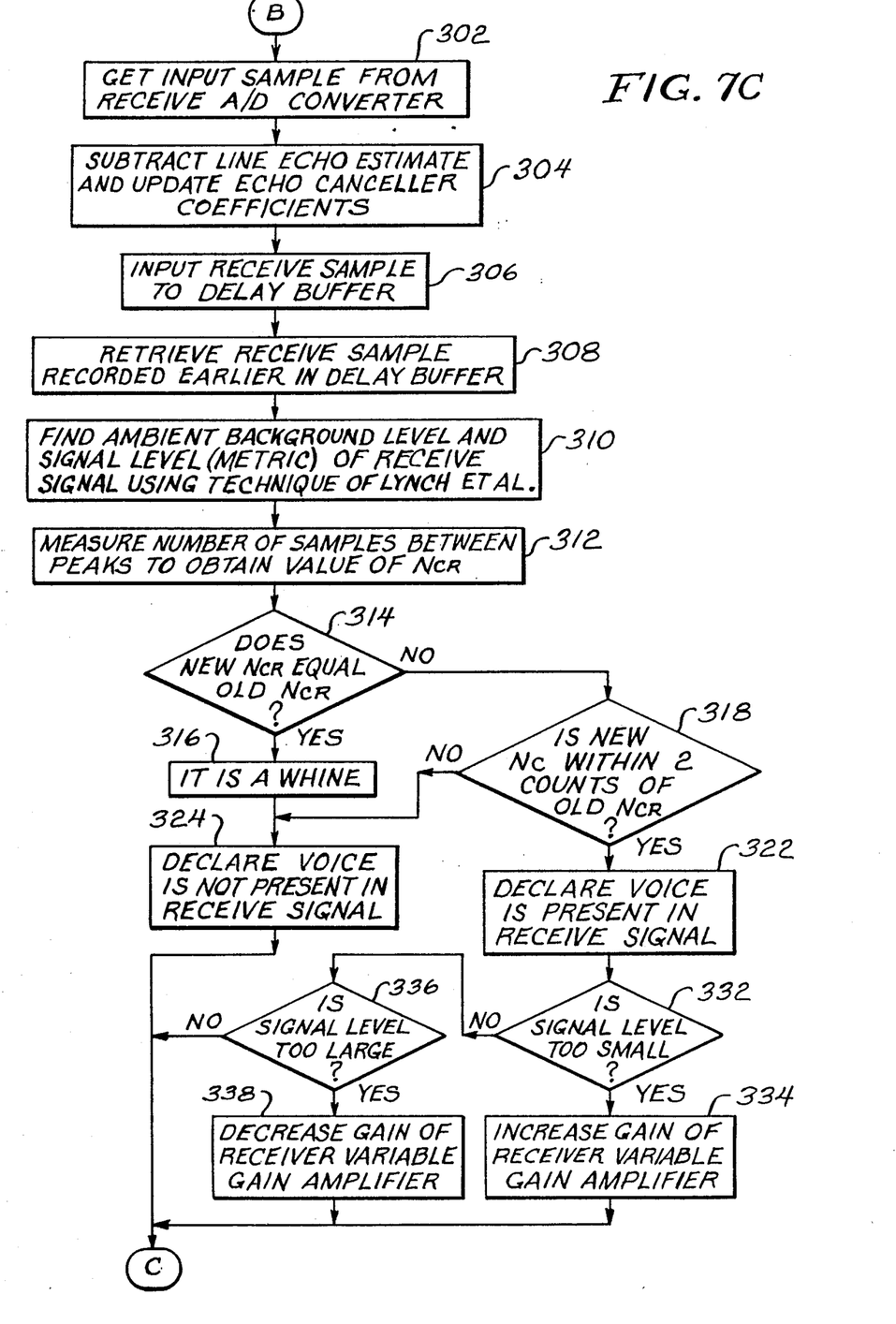
Figure 7D:
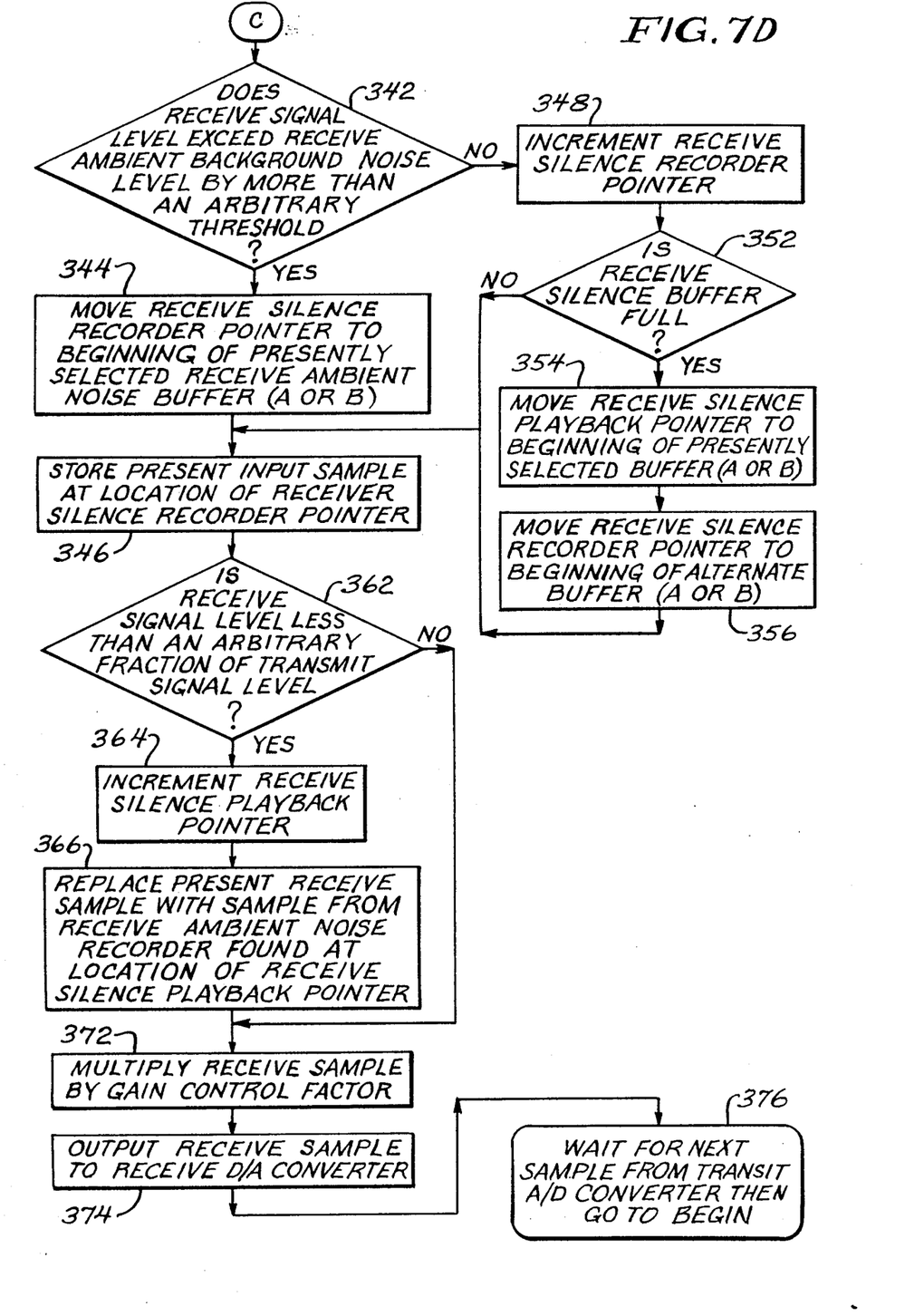

Accordingly, making the substitutions identified above, the computer program processing and decision steps 302, 304, and 310 through 366 are the same as those described above for steps 202 through 266.

The processing steps 306 and 38 in FIG. 7C, for which there are no equivalents among the steps 202 through 266 in FIGS. 7A and 7B, implement the delay buffer 70. Accordingly, in processing step 306 the digitized sample of the received signal processed in the received signal summing junction 66 is transferred from its output 68 to the delay buffer 70. Analogously, in processing step 308 the oldest sample of the received signal previously recorded in the delay buffer 70 is retrieved for further processing.

Whether or not a sample of pre-recorded received signal ambient noise has been substituted for the present sample of the processed received signal Rx' in steps 362 through 366 thereby providing the received signal selector switch 74, in processing step 372 the computer program next multiplies the present sample by a gain control factor to provide the function of the volume control 78. Processing of this sample of the processed received signal Rx' then concludes in processing step 374 by transmitting the current sample of that signal to the receive DAC 84.

After the current sample of the processed received signal Rx' is transmitted to the receive DAC 84, the computer program execution pauses in wait step 376 until the transmit ADC 92 converts the next sample of the analogue microphone output signal into the digital microphone output signal. When conversion of the next sample of the digital microphone output signal occurs, computer program execution resumes at step 202.

Although the present invention has been described in terms of the presently preferred embodiment, it is to be understood that such disclosure is purely illustrative and is not to be interpreted as limiting. As stated previously, the signal processor 22, except for the ADCs 62 and 92 and the DACs 84 and 104, is implemented using a Texas Instruments TMS320C25 Digital Signal Processor integrated circuit. Accordingly, digital signal processing techniques are the preferred embodiment for the adaptive FIR filters used for the near side echo canceling filter 116 and for the far side echo canceling filter 126. Alternatively, the signal processing performed by these filters could be performed by analogue signal processing devices such as Charge Coupled Devices ("CCDs"). Similarly, the tracking comb filter 108 could also be implemented with an analogue signal processing device rather than the digital signal processing technique of the preferred embodiment.

Similarly, while the invention has been disclosed with the tracking comb filter 108 located in the transmitted signal path 114, it could alternatively be located in the received signal path 86. If the tracking comb filter 108 is located in the received signal path 86, then the processed transmitted signal Tx' output signal from the transmitted signal summing junction 96 is used to control the characteristics of the tracking comb filter 108, rather than the processed received signal Rx' from the received signal summing junction 66.

While the speakerphone 10 of the present invention has been disclosed in its preferred embodiment adapted for use in a videoconferencing system, the signal processing used in the speakerphone 10 is applicable to any full duplex voice communication system in which echoes or "singing" may occur. For example, with the delay buffer 70 eliminated, the signal processing used in the speakerphone 10 is applicable to intercom systems such as those used for placing drive-up orders at fast food restaurants.

Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A full duplex speakerphone for simultaneously:
receiving and transmitting signals over a telephone line comprising:
(a) a microphone for converting audible communications to be transmitted into a microphone output signal;
(b) a speaker for converting a received signal into an audible communication; and
(c) means for signal processing both the received signal and the microphone output signal, said signal processing means including:
  i. a received signal processing path including a first summing junction having a first input to which the received signal is coupled, said first summing junction transmitting an output signal to said speaker;
  ii. a transmitted signal processing path including a second summing junction having a first input to which the microphone output signal is coupled;
  iii. a tracking comb filter means included in said transmitted signal processing path, for attenuating the portion of the microphone output signal resulting from speaker feedback;

iv. near side echo canceling means for receiving the output signal from said first summing junction, and producing an output signal supplied as a second input signal to said second summing junction, said output signal being combined with the microphone output signal at said second summing junction to minimize echo; and     v. far side echo canceling means for receiving the filtered signal transmitted from said tracking comb filter and producing an output signal supplied as a second input signal to said first summing junction, said output signal being combined with the received signal at said first summing junction to minimize echo in the received signal.

2. The speakerphone of claim 1 wherein said signal processing means further includes:

ambient noise recording means located in said received signal processing path for recording the output signal from said first summing junction during time intervals in which the signal is below a predetermined threshold; and received signal selector means located in said received signal processing path to select for transmission to said speaker either the output signal from said first summing junction or the output signal from said ambient noise recording means.

3. The speakerphone of claim 1 wherein said signal processing means further includes received signal delay means located in said received signal processing path for delaying the transmission of the output signal from said first summing junction.

4. The speakerphone of claim 1 wherein said signal processing means further includes received signal volume control means located in said received signal processing path for controlling the signal level of the output signal from said first summing junction that is applied to said near side echo canceling means.

5. The speakerphone of claim 1 wherein said signal processing means further includes transmitted signal selector means located in said transmitted signal processing path to select for transmission either the output signal from said second summing junction or the output signal from said tracking comb filter means.

6. The speakerphone of claim 1 wherein said signal processing means further includes:

transmitted signal ambient noise recording means located in said transmitted signal processing path for recording the output signal from said second summing junction during time intervals in which that signal is below a predetermined threshold; and transmitted signal selector means located in said transmitted signal processing path for selecting, for transmission either, the output signal from said transmitted signal summing junction, the output signal from said tracking comb filter, or an output signal from said transmitted signal ambient noise recording means.

7. The device of claim 1 wherein said tracking comb filter means includes means for subtracting a delayed sample of the signal (TX) from said second summing junction from a present sample of said signal, thereby to block retransmission of received signal components.

8. A signal processing apparatus for suppressing echoes in a full duplex communication system, said signal processing apparatus comprising:

(a) a received signal input to which is applied a received signal that is to be re-transmitted;

(b) a received signal output from which said signal processing apparatus re-transmits the received signal after it has been signal processed to suppress echoes;

(c) a transmitted signal input to which is applied a transmitted signal that is to be re-transmitted;

(d) a transmitted signal output from which said signal processing apparatus re-transmits the transmitted signal after it has been signal processed to suppress echoes;

(e) a received signal processing path including a first summing junction having a first input to which the received signal is coupled from said received signal input, said first summing junction transmitting an output signal to said received signal output;

(f) a transmitted signal processing path including a second summing junction having a first input to which the transmitted signal is coupled from said transmitted signal input, said second summing junction transmitting an output signal to a tracking comb filter also included in said transmitted signal processing path, said tracking comb filter attenuating a portion of said received signal, which portion is present in said transmitted signal;

(g) near side echo canceling means for receiving the output signal transmitted from said first summing junction, transmitting as an output signal a selected portion thereof, said output signal being supplied as a second input signal to said second summing junction wherein output signal is combined with the transmitted signal; and     (h) far side echo canceling means for receiving the filtered signal transmitted from said tracking comb filter, and transmitting as an output signal a selected portion thereof, said output signal from said far side echo canceling means being supplied as a second input signal to said first summing junction wherein said output signal is combined with the received signal.

9. The apparatus of claim 8 wherein said signal processing means further includes:

ambient noise recording means located in said received signal processing path for recording the output signal from said first summing junction during time intervals in which that signal is below a predetermined threshold; and received signal selector means located in said received signal processing path to select for transmission to said speaker either the output signal from said first summing junction or the output signal from said ambient noise recording means.

10. The apparatus of claim 8 wherein said signal processing means further includes received signal delay mean located in said received signal processing path for delaying the transmission of the output signal from said first summing junction.

11. The apparatus of claim 8 wherein said signal processing means further includes:

transmitted signal ambient noise recording means located in said transmitted signal processing path for recording the output signal from said second summing junction during time intervals in which that signal is below a predetermined threshold; and transmitted signal selector means located in said transmitted signal processing path for selecting, for transmission to said transmitted signal output of said signal processing means, the output signal from said transmitted signal summing junction, the output signal from said tracking comb filter, or an output signal from said transmitted signal ambient noise recording means.

12. A method of signal processing in a full duplex communication system, said method processing a received signal to produce an output received signal and a transmitted signal to produce an output transmitted signal, said method comprising:
(a) applying said received signal to a first input of a first summing junction from which a processed received signal is transmitted;
(b) applying said transmitted signal to a first input of a second summing junction from which a processed transmitted signal is transmitted;
(c) applying a selected portion of said processed received signal from the first summing junction as a second input signal to the second summing junction in which such selected portion is combined with said transmitted signal to obtain said processed transmitted signal;
(d) passing said processed transmitted signal through a tracking comb filter having a transfer function the period of which is varied to track the period of said processed received signal to obtain a filtered transmitted signal;
(e) applying a selected portion of said filtered transmitted signal as a second input signal to the first summing junction in which such selected portion is combined with said received signal to obtain said processed received signal.

13. The method of claim 12 further comprising the steps of:
monitoring said processed received signal transmitted from the first summing junction to ascertain successive time periods for said signal;
determining a difference between successive time periods ascertained for said processed received signal; and
if the difference between successive time periods lies outside a pre-established range, utilizing said processed transmitted signal instead of said filtered transmitted signal as said output transmitted signal.

14. A method of signal processing in a full duplex communication system, said method processing a received signal to produce an output received signal and a transmitted signal to produce an output transmitted signal, said method comprising:
(a) applying said received signal to a first input of a first summing junction from which a processed received signal is transmitted;
(b) applying said transmitted signal to a first input of a second summing junction from which a processed transmitted signal is transmitted;
(c) applying a selected portion of said processed received signal from the first summing junction as a second input signal to the second summing junction in which such selected portion is combined with said transmitted signal to obtain said processed transmitted signal;

15. The method of claim 14 further comprising the steps of:
monitoring said processed received signal transmitted from the first summing junction means to ascertain successive time periods for said signal;
determining a difference between successive time periods ascertained for said processed received signal; and
if the difference between successive time periods lies outside a pre-established range, then selecting as said output transmitted signal said processed transmitted signal rather than said filtered transmitted signal.

16. The method of claim 14 further comprising the steps of:
during time intervals in which said processed received signal is below a predetermined threshold, recording said processed received signal in a received ambient noise recording means;
during intervals in which said processed received signal is below a predetermined threshold, selecting as said output received signal an output signal from the received ambient noise recording means rather than said processed received signal.

17. The method of claim 14 further comprising the steps of:
during time intervals in which said processed transmitted signal is below a predetermined threshold, recording said processed transmitted signal in a transmitted ambient noise recording means;
during intervals in which said processed transmitted signal is below a predetermined threshold, selecting as said output transmitted signal an output signal from the transmitted ambient noise recording means rather than said filtered transmitted signal or said processed transmitted signal.

18. The method of claim 17 further comprising the steps of:
during time intervals in which said processed received signal is below a predetermined threshold, recording said processed received signal in a received ambient noise recording means;
during intervals in which said processed received signal is below a predetermined threshold, selecting as said output received signal an output signal from the received ambient noise recording means rather than said processed received signal.

19. The method of claim 17 further comprising the steps of:
monitoring said processed received signal transmitted from the first summing junction to ascertain successive time periods for said signal;
determining a difference between successive time periods ascertained for said processed received signal; and
if the difference between successive time periods ascertained for said processed received signal lies within a pre-established range, then adjusting said signal level of said received signal.

20. The method of claim 17 further comprising the steps of:
monitoring said processed transmitted signal transmitted from the second summing junction to ascertain successive time periods for said signal;
determining a difference between successive time periods ascertained for said processed transmitted signal; and
if the difference between successive time periods ascertained for said processed transmitted signal lies within a pre-established range, then adjusting said signal level of said transmitter signal.

21. The method of claim 20 further comprising the steps of:
monitoring said processed received signal transmitted from the first summing junction to ascertain successive time periods for said signal;
determining a difference between successive time periods ascertained for said processed received signal; and
if the difference between successive time periods ascertained for said processed received signal lies within a pre-established range, then adjusting said signal level of said received signal.

22. The method of claim 14 further comprising the steps of:
monitoring said processed received signal transmitted from the first summing junction to ascertain successive time periods for said signal;
determining a difference between successive time periods ascertained for said processed received signal; and
if the difference between successive time periods ascertained for said processed received signal lies within a pre-established range, then adjusting said signal level of said received signal.

23. A full duplex speakerphone for simultaneously receiving and transmitting signals over a telephone line comprising:
(a) a microphone for converting audible communications to be transmitted into a microphone output signal;
(b) a speaker for converting a received signal into an audible communication; and
(c) means for signal processing both the received signal and the microphone output signal, said signal processing means including:
  i. a received signal processing path including a first summing junction having a first input to which the received signal is coupled, said first summing junction transmitting an output signal to said speaker;
  ii. a transmitted signal processing path including a second summing junction having a first input to which the microphone output signal is coupled;
  iii. a tracking comb filter having a transfer function, the period of which is varied to track the period of said received signal for attenuating the portion of the microphone output signal resulting from speaker feedback;
  iv. near side echo canceling means for receiving the output signal from said first summing junction, and producing an output signal supplied as a second input signal to said second summing junction, said output signal being combined with the microphone output signal at said second summing junction to minimize echo; and
  v. far side echo canceling means for receiving the filtered signal transmitted from said tracking comb filter and producing an output signal supplied as a second input signal to said first summing junction, said output signal being combined with the received signal at said first summing junction to minimize echo in the received signal.

* * * * *

UNITED STATES PATENT AND TRADEMARK OFFICE
CERTIFICATE OF CORRECTION

PATENT NO. : 4,965,822
DATED : Oct. 23, 1990
INVENTOR(S) : Errol R. Williams

It is certified that error appears in the above—identified patent and that said Letters Patent is hereby corrected as shown below:

Claim 2, column 15, line 25, replace "the" with -- that --.

Claim 10, column 16, line 59, insert -- s -- after "mean".

Claim 14, column 17, line 66, insert the following after "signal;"
-- (d) passing said processed transmitted signal through a tracking comb filter having a transfer function to obtain a filtered transmitted signal;
(e) applying a selected portion of said filtered transmitted signal as a second input signal to the first summing junction in which such selected portion is combined with said received signal to obtain said processed received signal;
(f) monitoring said processed received signal transmitted from said first summing junction to ascertain a time period for said signal;
(g) adjusting the transfer function of the tracking comb filter means to match the time period ascertained by monitoring said processed received signal. --

Claim 20, column 19, line 2, replace "transmitter" with -- transmitted --.

Signed and Sealed this

Eighteenth Day of February, 1992

*Attest:*

HARRY F. MANBECK, JR.

*Attesting Officer*      *Commissioner of Patents and Trademarks*